US006748598B1

United States Patent  (10) Patent No.: US 6,748,598 B1
De Bot  (45) Date of Patent: Jun. 8, 2004

(54) COMMUNICATION SYSTEM WITH BROADBAND AND TELEPHONE NETWORK INTERFACES

(75) Inventor: Paulus George Maria De Bot, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 407 days.

(21) Appl. No.: 09/702,346

(22) Filed: Oct. 31, 2000

(30) Foreign Application Priority Data

Nov. 4, 1999 (EP) .............................. 99203645

(51) Int. Cl.$^7$ ................................ H04N 7/16
(52) U.S. Cl. .................. 725/133; 725/141; 725/153
(58) Field of Search .................. 348/552, 553, 348/714, 14.01, 14.04, 14.06, 14.13; 370/354; 379/88.13; 725/141, 142, 133, 134, 153

(56) References Cited

U.S. PATENT DOCUMENTS

| 5,473,366 | A |   | 12/1995 | Imaeda et al. ............. 348/14 |
| 5,561,709 | A | * | 10/1996 | Remillard .................... 379/96 |
| 5,627,836 | A | * | 5/1997 | Conoscenti et al. ......... 370/397 |
| 5,712,903 | A | * | 1/1998 | Bartholomew et al. ..... 379/88.25 |
| 5,715,315 | A | * | 2/1998 | Handelman .................. 380/49 |
| 6,052,444 | A | * | 4/2000 | Ferry et al. ............. 379/93.35 |
| 6,292,172 | B1 | * | 9/2001 | Makhlouf ................... 345/157 |
| 6,452,923 | B1 | * | 9/2002 | Gerzberg et al. ........... 370/352 |
| 6,535,590 | B2 | * | 3/2003 | Tidwell et al. ............ 379/110.1 |
| 6,543,052 | B1 | * | 4/2003 | Ogasawara .................. 725/60 |
| 2001/0046237 | A1 | * | 11/2001 | Chan et al. ................ 370/419 |

FOREIGN PATENT DOCUMENTS

| EP | 0698985 A2 | 2/1996 |
| WO | 9824226 | 6/1998 |

OTHER PUBLICATIONS

EN 301 195 "Digital Video Broadcasting (DVB); Interaction Channel Through the Global System for Mobile Communication".

* cited by examiner

Primary Examiner—Victor R. Kostak

(57) ABSTRACT

In a communication system a communication device (2) is present for receiving a wideband broadcast signal from a headend. For providing a return channel to enable interactive TV services, the communication device (2) is connected to a telephone network. In order to be able to also provide a voice mail services storage unit (50) is present in the communication device (2) for storing voice messages received from the telephone network, a retrieval unit for retrieving the stored voice messages from the storage unit (50) and a supply unit for supplying the retrieved voice messages to an audio output of the communication device for playback. In an embodiment of the invention, the communication device (2) is integrated in a TV set (3).

14 Claims, 2 Drawing Sheets

COMMUNICATION SYSTEM WITH BROADBAND AND TELEPHONE NETWORK INTERFACES

FIELD OF THE INVENTION

BACKGROUND OF THE INVENTION

The present invention relates to a communication system comprising a communication device which is coupled to a broadband distribution network and to a telephone network, the communication device comprising means for deriving an audio signal from a signal received from the broadband distribution network and means for supplying the audio signal to an audio output.

The present invention also relates to a communication device and a TV receiver comprising such a communication device.

A communication system according to the preamble is known from EN 301 195, "Digital Video Broadcasting (DVB); Interaction channel through the global system for mobile communication.

Presently, in various countries digital TV systems are deployed, mainly based on the DVB (Digital Video Broadcast) or the ATSC (Advanced Television Systems Committee) standards. Both standards provide the possibility to introduce interactive services. Such interactive services can include, but are not limited to, Video on demand, pay per view, home shopping and playing games. In order to be able to introduce these interactive services, it is needed that the communication device can transmit control messages to a server via a return channel. In the above standard it is proposed to use a telephone network such as the GSM network for the return channel.

SUMMARY OF THE INVENTION

An object of the present invention is to provide a communication system according to the preamble which provides additional services.

To achieve the above object, the present invention is characterized in that the communication device comprises voice signal receiving means for receiving voice signals from the telephone network, the communication device further comprising storage means for storing the voice signals, retrieval means for retrieving the stored voice signals from the storage means and supply means for supplying the retrieved voice signals to the audio output.

By these measures the communication system can provide voice mail services: voice signals or messages can be received from the telephone network, for instance when a user of the system is not present, and can be stored onto the storage means. Furthermore, these stored voice signals can be retrieved, preferably on request of the user, from the storage means and supplied to the audio output so that they can be listened to by the user at a convenient moment.

An embodiment of the invention is characterized in that the communication device comprises signaling means for signaling the presence of stored voice signals. By introducing the signaling means a user can easily see whether there are stored voice signals or messages.

A further embodiment of the invention is characterized in that a TV receiver comprises the communication device. This gives a complete integration of voice mail and TV functions.

BRIEF DESCRIPTION OF THE DRAWINGS

The present invention will now be explained with reference to the drawings.

DETAILED DESCRIPTION OF THE INVENTION

Figure 1:
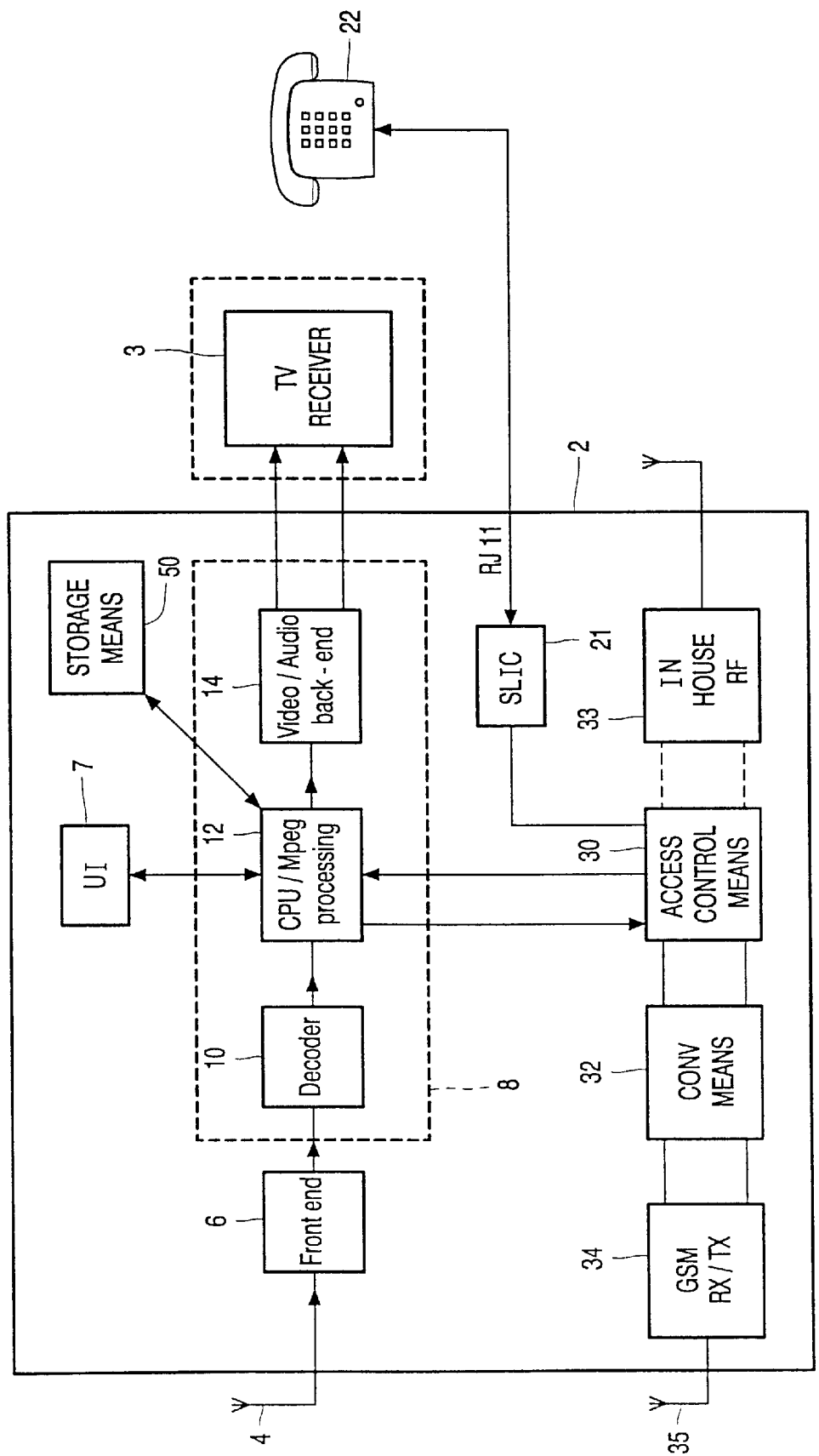
FIG. 1 shows a block diagram of a first embodiment of the invention.

In the communication system according to FIG. 1, the first port of the communication device 2 is connected to a broadband distribution network via an antenna 4. This communication device can be a set-top box to be used with a TV receiver 3. Alternatively, it is also possible that the communication device is integrated in the TV receiver 3. In this case the distribution network is a terrestrial or satellite channel such as DVB-T or DVB-S. Alternatively, the broadband distribution network can also be a CATV distribution network. The second port of the communication device 2 is connected to a mobile radio telephone network via an antenna 35.

The first port of the communication device 2 is connected to an input of a front end 6. An output of the front end 6 is connected to an input of a channel decoder 10 which derives a stream of (error corrected) digital symbols from the output signal of the front-end 6. The output signal of the decoder 10 can e.g. be an MPEG-2 transport stream.

The output of the decoder 10 is connected to a processor 12. In the case that an MPEG-2 signal is used, the processor 12 is arranged for extracting and decoding the video signal carried by the MPEG-2 transport stream. The processor 12 is also arranged for extracting control information from the MPEG-2 transport stream and for reading commands entered by a user on a user interface 7.

The decoded audio and video signals from the communication device 2 are supplied to a TV receiver 3 for playback. In interactive TV systems it is common that signals from the set-top box 2 have to be transmitted to a head-end in order to control the signals to be received from the broadband distribution network. Such control signals can include signals for selecting a particular TV program from a video on demand service or for transmitting time stamps to the head-end in case of impulse pay per view systems. These signals to be transmitted are applied via access control means 30 and conversion means 32 to a transceiver 34. This transceiver 34 transmits the control signals via the telephone network to the head end.

If during the transmission of data by the transceiver 34 the telephone 22 is activated for setting up a telephone call, this is signaled via the access control means 30 to the processor 12. The processor 12 then transmits the current command via the transceiver 34 and will subsequently terminate the call to the head-end to release the telephone line for the telephone call to be made by means of the telephone 22.

The processor 12 subsequently may transmit a message on the TV receiver informing that certain command can not be issued during the telephone call. Some information such as Impulse Pay per View billing pulses can be temporarily stored in the set-top box 2 until the telephone line becomes available again. The processor also informs the user that certain services are available again when the telephone call has terminated.

In the communication system according to FIG. 1, a mobile radio network is used as a telephone network. Alternatively, a wired telephone network such as a POTS or a PSTN network can be used. Furthermore, the telephone network could also be identical to the broadband distribution network, i.e. the same physical network is used to distribute broadband signals and to transfer telephone signals. An example of such a combined broadband distribution/telephone network is a CATV network.

In FIG. 1, the telephone terminal 22 is connected to a subscriber line interface (SLIC) 21. The set-top box comprises a RJ 11 connector for connecting a wired phone. The subscriber line interface 21 is arranged for providing supply power and signaling tones to the telephone terminal 22. It also comprises means for detecting when the phone terminal goes off-hook. The subscriber line interface 21 comprises also an analogue to digital converter and a digital to analogue converter. The analogue to digital converter is arranged for converting the analogue signal received from the telephone terminal into a digital signal to be transmitted over the mobile radio network. The digital to analogue converter is arranged for converting the digital signal received from the mobile radio network into an analogue signal for the telephone terminal 22. Subscriber line interface are common devices readily available on the market as integrated circuits which are well known to those skilled in the art.

The access control means 30 are arranged for making a selection between the control signals from the processor 12 and the signals from/to the subscriber line interface 21. The signals from the access control means 30 are applied to the conversion means 32, which convert these signals into a signal which is suitable for being transmitted over the telephone network. The operations performed by the conversion means 32 include assembling frames comprising the signals to be transmitted and adding appropriate headers to it in order to comply with the operating standard of the mobile radio system. This standard can e.g. be GSM. The converted signals at the output of the conversion means are provided to a transceiver 34 which transmits these signal by means of the antenna 35 to the mobile radio network. The antenna 35 is also used for receiving signals from the mobile radio network. These signals can be intended for the processor 12 or for the telephone terminal 22. The transceiver 34 receives the signals from the mobile radio network and presents them to the conversion means 32. The conversion means 32 convert the data provided by the transceiver 34 into a format that is suitable for the device selected by the access control means 30.

The communication device 2 comprises storage means 50, e.g. solid state memory, a hard disk drive, a magnetic or optical tape drive or an optical disk. This storage means 50 can store voice signals or messages which are received by the transceiver 34 from the telephone network. These received voice signals are transferred by the processor 12 from the transceiver 34 via the conversion means 32 and the access control means 30 to the storage means 50. The stored voice signals can, e.g. on request of a user which request was entered by means of the user interface 7, be retrieved from the storage means 50 by the processor 12 and supplied via the video/audio back end to the TV receiver 3 for playback. In this way the communication system provides voice mail functionality.

The communication device 2 may comprise signaling means for signaling the presence of stored voice signals. The signaling means may comprise a led or a lamp which is located on the outside of the communication device 2. Alternatively, the processor 12 may display a message on the TV receiver 3 informing that stored voice signals are present on the storage means 50.

It is possible that the communication device 2 further comprises an in house RF unit 34 which is used to control several appliances such as audio systems, VCR's etc. Then the access control means 30 can also be arranged for selecting the in house RF unit 34 as source or destination to be connected to the conversion means 32.

Figure 2:
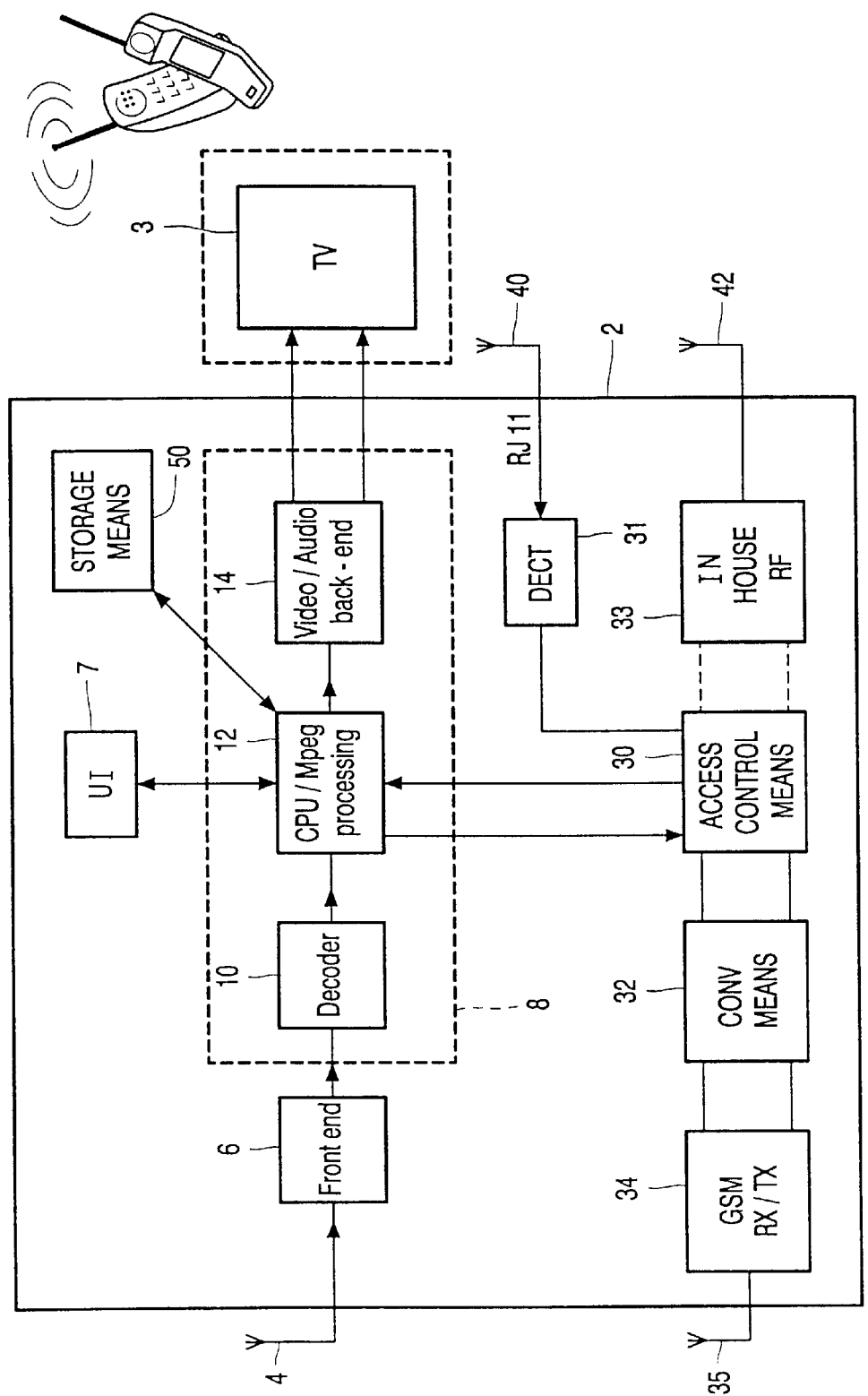
FIG. 2 shows a block diagram of a second embodiment of the invention.

In the communication system according to FIG. 2, the connections to the telephone terminal 22 are also made wireless. To that end a DECT base station 31 is connected to the access control means 30. The arrangement according to FIG. 3 has a plurality of antennas. These antennas could be combined to a single antenna by using suitable coupling means for coupling the DECT transceiver 31, the in house RF transceiver 42 and the GSM transceiver. These coupling means could be consist of a plurality of bandpass filters for separating the different RF signals. Of course, the frequencies for the DECT transceiver 31, the in-house RF transceiver 33 and the GSM transceiver should then be different.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

What is claimed is:

1. A communication system comprising:
   a communication device including a first interface adapted for receiving uni-directional communication with from a broadband distribution network, and a second interface adapted to control one or more interactive services provided between the broadband network and a user by providing bi-directional communication with a telephone network to send and receive control messages between a server in communication with the broadband network and the user, and:
   a receiver adapted for deriving an audio signal from a signal received from the broadband distribution network and supplying the derived audio signal to an audio output, a voice signal receiver arranged to receive voice signals from the telephone network, storage means for storing the voice signals, retrieval means for retrieving the stored voice signals from the storage means and supply means for supplying the retrieved voice signals to the audio outputs;
   conversion means for converting data into a format that is suitable for one or more appliances in addition to the receiver; and
   an in house RF unit for controlling the one or more appliances in addition to the receiver, wherein said in house RF unit is adapted to be connected to the conversion means both a source and a destination of control data.

2. The communication system according to claim 1, wherein the communication device is arranged for retrieving the stored voice signals from the storage means on request of a user.

3. The communication system according to claim 1, wherein the communication device further includes signaling means for signaling the presence of stored voice signals to a user.

4. The communication system according to claim 1, wherein a TV receiver includes the communication device.

5. A communication device comprising:
   a first port for receiving signals from a broadband distribution network;
   a second port coupled to a telephone network to control one or more interactive services provided between the broadband network and a user by providing bi-directional communication;

means for deriving an audio signal from a signal received from the broadband distribution network;

means for supplying the audio signal to an audio output;

voice signal receiving means for receiving voice signals from the telephone network;

storage means for storing the voice signals;

retrieval means for retrieving the stored voice signals from the storage means; and supply means for supplying the retrieved voice signals to the audio outputs;

conversion means for converting signals into a format that is suitable for one or more appliances in addition to the receiver; and an in house RF unit for controlling the one or more appliances in addition to the receiver, wherein said in house RF unit is adapted to be connected to the conversion means both a source and a destination of control data.

6. The communication device according to claim 5, wherein the communication device is arranged for retrieving the stored voice signals from the storage means on request of a user.

7. The communication device according to claim 5, further comprising signaling means for signaling the presence of stored voice signals to a user.

8. A TV receiver comprising a communication device according to claim 5.

9. The communication system according to claim 1, wherein the receiver is capable of detecting a control signal from the broadband distribution network and supplying the control signal to the second interface for transmission over the telephone network.

10. The communication system according to claim 9, further comprising access control means for making a selection between the control signal and a signal from a subscriber line interface.

11. The communication system according to claim 1, wherein the receiver includes an MPEG decoder.

12. The communication device according to claim 5, wherein the means for deriving is capable of detecting a control signal from the broadband distribution network and supplying the control signal to the second port for transmission over the telephone network.

13. The communication device according to claim 12, further comprising access control means for making a selection between the control signal and a signal from a subscriber line interface.

14. The communication device according to claim 5, wherein the means for deriving includes an MPEG decoder.

* * * * *